United States Patent [19]
Fecteau et al.

[11] Patent Number: 6,106,696
[45] Date of Patent: Aug. 22, 2000

[54] MOVING BED REFORMING PROCESS WITHOUT HEATING BETWEEN THE COMBINED FEED EXCHANGER AND THE LEAD REACTOR

[75] Inventors: David John Fecteau, Prospect Heights; Kenneth David Peters, Elmhurst, both of Ill.

[73] Assignee: UOP LLC, Des Plaines, Ill.

[21] Appl. No.: 09/206,175

[22] Filed: Dec. 4, 1998

Related U.S. Application Data

[60] Provisional application No. 60/069,717, Dec. 16, 1997.

[51] Int. Cl.⁷ .......................... C10G 59/02; C10G 35/12
[52] U.S. Cl. ........................ 208/64; 208/63; 208/65; 208/134; 208/169
[58] Field of Search .................. 208/63, 64, 65, 208/134, 169

[56] References Cited

U.S. PATENT DOCUMENTS

| | | | |
|---|---|---|---|
| 2,809,922 | 10/1957 | Berg et al. | 208/64 |
| 3,011,965 | 12/1961 | Decker | 208/64 |
| 3,054,744 | 9/1962 | Elliott | 208/64 |
| 3,647,680 | 3/1972 | Greenwood et al. | 208/65 |
| 3,652,231 | 3/1972 | Greenwood et al. | 422/223 |
| 3,658,691 | 4/1972 | Keith et al. | 208/65 |
| 3,692,496 | 9/1972 | Greenwood et al. | 422/191 |
| 3,706,536 | 12/1972 | Greenwood et al. | 422/191 |
| 4,104,149 | 8/1978 | Veinerman et al. | 208/64 |
| 4,110,197 | 8/1978 | Herning et al. | 208/64 |
| 4,255,250 | 3/1981 | McCoy | 208/64 |
| 4,325,806 | 4/1982 | Peters | 208/64 |
| 4,325,807 | 4/1982 | Peters | 208/80 |
| 4,478,793 | 10/1984 | Vickers | 422/216 |
| 4,551,228 | 11/1985 | Ramella et al. | 208/65 |
| 5,135,643 | 8/1992 | Ward | 208/137 |
| 5,169,812 | 12/1992 | Kocal et al. | 502/61 |

OTHER PUBLICATIONS

"UOP Platforming Process" (Chapter 4.1) *Handbook of Petroleum Refining Processes,* 2$^{nd}$ Ed., editor: Robert A. Meyers; McGraw–Hill Book Company; New York; 1997.

"Reforming Processes, Maximizing Profitability" Richard Lee et al. *Encyclopedia of Chemical Processing and Design* pp. 151–164 vol. 47, editor: John J. McKetta, Marcel Dekker, Inc., New York, 1994.

*Primary Examiner*—Walter D. Griffin
*Attorney, Agent, or Firm*—John G. Tolomei; Michael A. Moore

[57] ABSTRACT

This invention is a reforming process that employs at least two moving bed reaction zones. One of the reaction zones, called the lead reaction zone, passes catalyst particles and a hydrocarbon-containing effluent to the other reaction zone, which operates at an inlet temperature that is at least 60° F. (33° C.) hotter than the lead reaction zone. In a preferred embodiment, this invention employs no heating between the combined feed exchanger and the lead reaction zone. This invention is particularly applicable to reforming processes that employ continuous regeneration sections.

15 Claims, 1 Drawing Sheet

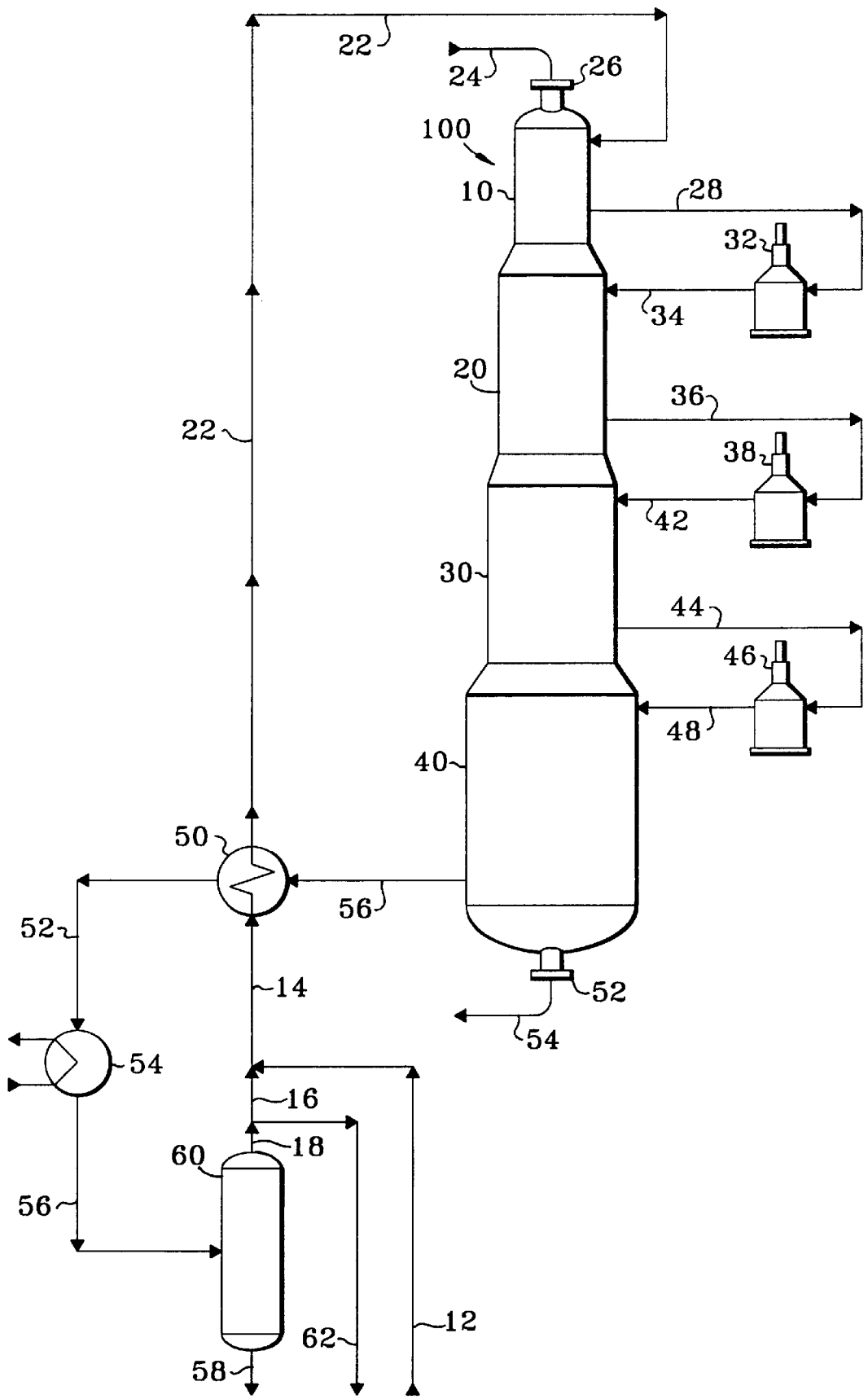

MOVING BED REFORMING PROCESS WITHOUT HEATING BETWEEN THE COMBINED FEED EXCHANGER AND THE LEAD REACTOR

CROSS REFERENCE TO RELATED APPLICATIONS

This application claims the benefit of U.S. Provisional Application No. 60/069,717, filed Dec. 16, 1997.

FIELD OF THE INVENTION

The field of this invention is the reforming of hydrocarbons.

BACKGROUND OF THE INVENTION

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen to form what is commonly referred to as a combined feed stream, and the combined feed stream is contacted with catalyst in a reaction zone. The usual feedstock for catalytic reforming is a petroleum fraction known as naphtha and having an initial boiling point of about 180° F. (82° C.) and an end boiling point of about 400° F. (203° C.). The catalytic reforming process is particularly applicable to the treatment of straight run naphthas comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); 4,409,095 (Peters); and 4,440,626 (Winter et al.).

A catalytic reforming reaction is normally effected in the presence of catalyst particles comprised of one or more Group VIII (IUPAC 8–10) noble metals (e.g., platinum, iridium, rhodium, palladium) and a halogen combined with a porous carrier, such as a refractory inorganic oxide.

In a common form, the reforming process will employ the catalyst particles in several reaction zones interconnected in a series flow arrangement. There may be any number of reaction zones, but usually the number of reaction zones is 3, 4 or 5. Because reforming reactions occur generally at an elevated temperature, and because reforming reactions generally are endothermic, each reaction zone usually has associated with it one or more heating zones, which heat the reactants to the desired reaction temperature and which supply the endothermic heat of reaction for the reaction zones. As a consequence of these considerations, the most common process flow through the train of heating and reaction zones in a 3-reactor catalytic reforming processes is as follows.

A naphtha-containing feedstock admixes with a hydrogen-containing recycle gas to form a combined feed stream, which passes through a combined feed heat exchanger. In the combined feed heat exchanger, the combined feed is heated by exchanging heat with the effluent of the third reactor. The heating of the combined feed stream that occurs in the combined feed heat exchanger is, however, insufficient to heat the combined feed stream to the desired inlet temperature of the first reactor. Consequently, after exiting the combined feed heat exchanger and prior to entering the first reactor, the combined feed stream requires additional heating. This additional heating occurs in a heater, which is commonly referred to as a charge heater, which heats the combined feed stream to the desired inlet temperature of the first reactor.

The combined feed stream then passes to and through the first reactor. Because of the endothermic reforming reactions that occur in the first reactor, the temperature of the effluent of the first reactor falls not only to less than the temperature of the combined feed to the first reactor, but also and more importantly, to less than the desired inlet temperature of the second reactor. Therefore, the effluent of the first reactor passes through another heater, which is commonly referred to as the first interheater and which heats the first reactor effluent to the desired inlet temperature of the second reactor.

On exiting the first interheater the first reactor effluent enters the second reactor. As in the first reactor, endothermic reactions cause another decline in temperature across the second reactor. Generally, however, the temperature decline across the second reactor is less than the temperature decline across the first reactor, because the reactions that occur in the second reactor are generally less endothermic than the reactions that occur in the first reactor. Despite the somewhat lower temperature decline across the second reactor, the effluent of the second reactor is nevertheless still at a temperature that is less than the desired inlet temperature of the third reactor. Consequently, the effluent of the second reactor passes through another heater, which is commonly referred to as the second interheater, and then passes to the third reactor.

In the third reactor, endothermic reactions cause yet another temperature decline, which is generally less than that across the second reactor, for the like reason that the temperature decline across the second reactor is generally less than that across the first reactor. The effluent of the third reactor passes to the previously mentioned combined feed exchanger, where the effluent of the third reactor is cooled by exchanging heat with the combined feed stream.

After a period of time in use, the catalyst becomes deactivated during the course of reforming reactions as a result of mechanisms such as the deposition of coke on the particles. Coke is comprised primarily of carbon, but is also comprised of a small quantity of hydrogen. Coke decreases the ability of catalyst to promote reforming reactions to the point that continued use of the catalyst is no longer practical or economical. At that point, the catalyst must be reconditioned, or regenerated, before it can be reused in a reforming process.

Numerous regeneration methods are in use commercially, and nearly all involve to some extent the combustion of coke from the surface of the catalyst. The particular method of regeneration that a specific reforming process employs depends on the design of the catalyst bed(s) in the reforming reactor(s). A commercial reforming reactor generally employs one of two different designs of catalyst beds: moving beds and fixed beds. In a moving bed, deactivated catalyst is withdrawn from the catalyst bed, while fresh or regenerated catalyst is added to the bed. Moving catalyst beds allow catalyst to be continuously moved from the reactor to an adjacent regeneration zone, regenerated, and moved back to the reactor. This is commonly referred to as continuous regeneration, although in practice it is often semicontinuous.

In contrast, fixed catalyst beds keep the catalyst stationary. When the catalyst in a fixed bed reactor becomes deactivated, the reactor is temporarily taken out of service while the catalyst is either regenerated in situ or else unloaded and replaced with regenerated or fresh catalyst. Two types of fixed bed regeneration methods are used commercially: cyclic regeneration and semi-regeneration. In the cyclic regeneration method, at least one or at most not all of the reactors are taken out of service at any one time and the reforming process continues in operation with the remaining reactors. After the deactivated catalyst is regenerated, the reactor is placed back in service, which in turn allows another reactor to be taken out of service for regeneration. In semi-regenerative reforming, the reforming process is temporarily stopped and all of the reactors are taken out of service simultaneously for regeneration. After the catalyst has been regenerated, all the reactors are placed back in service and the reforming process is resumed.

Commercial reforming process units that use the flow schemes and regeneration methods just described require a large investment of capital, and one of the major capital costs is that associated with the charge heater. As previously mentioned, the charge heater heats the combined feed stream to the desired inlet temperature of the first reactor. As also mentioned, the charge heater is typically needed because the heat that is transferred by the combined feed exchanger from the third reactor effluent to the combined feed is not sufficient to heat the combined feed stream to the desired inlet temperature of the first reactor. But, because of the capital cost of the charge heater, reforming processes are sought that eliminate the need for a charge heater.

It is known that a reforming process unit that uses the semi-regeneration method can operate without a charge heater. In one such unit, the combined feed heat exchanger comprises a plate type heat exchanger which heats the combined feed stream, and the heated combined feed stream then passes directly to a first reactor which contains a fixed bed of platinum-rhenium catalyst. The first reactor effluent then passes to a train of pairs of heaters and reactors that contain fixed beds of platinum-rhenium catalyst; that is to a first heater, a second reactor, a second heater, a third reactor, a third heater, and a fourth reactor. The fourth reactor effluent transfers heat to the combined feed stream via the plate type heat exchanger, and then passes to a product recovery section. The inlet temperature of the first reactor ranges typically from about 784 to about 849° F. (418 to 454° C.). The inlet temperatures of the second, third, and fourth reactors typically are within about 5° F. (3° C.) of each other, and are typically from about 81 to about 102° F. (45 to 57° C.) hotter than the inlet temperature of the first reactor, and usually vary over the range of from about 878 to about 939° F. (470 to 504° C.). The molar ratio of hydrogen per hydrocarbon feedstock is typically between 4 and 6.

It is also known that a reforming unit that uses the continuous regeneration method can operate with different feed inlet temperatures for each of the reactors. Typically, such a unit has a train of three, four or five pairs of heaters and reactors that contain moving beds of catalyst, but many of the various possible combinations of different inlet temperatures, which together form what is usually called the temperature profile of the unit, are perhaps best illustrated with a three-reactor unit. If the inlet temperatures of all three reactors are the same, then the temperature profile is commonly called flat, which is the profile that is most frequently employed in reforming units using continuous regeneration. If the inlet temperature of the first reactor is less than the inlet temperature of the second reactor, which is in turn less than the inlet temperature of the third reactor, then the profile of the reactor inlet temperatures is usually said to be ascending. If the first inlet temperature is more than the second inlet temperature, which is more than the third inlet temperature, then the profile is normally called descending. If the second inlet temperature is more than both the first and third inlet temperatures, then the profile is often said to resemble a hill. If the second inlet temperature is less than both the first and third inlet temperatures, then the profile is frequently said to look like a valley. Thus, in the ascending and hill profiles, the inlet temperature of the second reactor is greater than the inlet temperature of the third reactor.

The most common reason for operating with a non-flat (i.e., skewed) reactor inlet temperature profile is to allocate the required heat duty among the heaters in the heater-reactor train. Ideally, all of the heaters are individually delivering heat at approximately the same percentage of their individual design duties. When each heater is operating at the same percentage of its design duty as any other heater in the train is operating as a percentage of that other heater's design duty, then the heater duties are said to be "balanced." Of course, a heater should not, as a general rule, be operated in excess of its design duty, that is the percentage should generally be less than or equal to 100%. A flat profile could result in imbalance of the operating duties of the heaters in the train, if some of the operating variables such as feedstock quality or throughput differ significantly from their design values, or if flow maldistribution or mechanical problems causes the performance of a reactor to fall significantly below its expected performance.

An illustration of attempting to balance heater duties in a commercial continuous reforming process by skewing reactor inlet temperatures is described in the article by Richard Lee, et al. entitled "Reforming Processes, Maximizing Profitability," which begins at page 151 in Volume 47 of the *Encyclopedia of Chemical Processing and Design,* edited by John J. McKetta and published by Marcel Dekker, Inc., New York in 1994. In the example in the article by Lee et al., a valley-shaped profile of reactor inlet temperatures is recommended, where the inlet temperatures of parallel reactors 1 and 2 are the same and greater than the inlet temperature of reactor 3, which is less than the inlet temperature of reactor 4. Reactor 4's inlet temperature may be the same as or less than that of reactors 1 and 2. The largest difference between the reactor 1, 2, and 4 inlet temperatures and the reactor 3 inlet temperature is 26° F. (14° C.). The Lee et al. article also teaches that the magnitude of the differences between the gasoline range product ($C_5$+ yield) when running an equal (that is, flat) reactor inlet temperature profile versus a staggered (that is, skewed) reactor inlet temperature profile is expected to be no more than 0.5% of feed.

Operating a reforming process without heating between the combined feed heat exchanger and the first or lead reactor has certain benefits which, however, are incapable of being realized in a reforming process unit that uses the semi-regeneration method. Therefore, reforming processes are sought that are capable of achieving more fully all the possible benefits and advantages of operating without a charge heater.

SUMMARY OF THE INVENTION

This invention is a reforming process that employs moving catalyst particle beds for the first, or lead, reactor and at least one other reactor, wherein the other reactor receives hydrocarbon effluent and catalyst particles from the first reactor and has an inlet temperature that is at least 60° F. (33° C.) hotter than the inlet temperature of the first reactor. Even though the inlet temperature of the first reactor is low in comparison to that of the other reactor, reforming reactions nevertheless occur in the first reactor. The reactions that take place in the first reactor reform mainly naphthenes, such as the dehydrogenation of cyclohexanes and also the dehydroisomerization of alkylcyclopentanes. These reactions occur readily at reforming conditions, and both reactions yield aromatics as well as by-product hydrogen. Moreover, these reactions occur at a relatively low temperature, which inhibits coke formation in the first reactor. Therefore, the catalyst particles that leave the first reactor of this invention have a relatively low coke content in comparison to prior art processes where the first reactor operates at a relatively higher temperature.

In this invention, the low-coke-containing catalyst particles from the first reactor enter the other reactor, which as already mentioned, operates at a relatively high inlet temperature relative to the first reactor. In the other reactor, reforming reactions occur, such as dehydrocyclization of paraffins and of olefins to yield aromatics, which are comparatively more difficult than the naphthene reforming reactions that occur in the first reactor and require relatively hotter temperatures. These comparatively difficult reactions, and the hotter temperatures, tend to accelerate coke formation. Thus, in this invention these comparatively difficult reactions occur in the presence of catalyst particles having a relatively low coke content, whereas in the prior art these reactions take place in the presence of catalyst particles having a relatively high coke content. By-product hydrogen from the first reactor also helps to inhibit coke formation in the other reactor in this invention.

Accordingly, an advantage of this invention over the prior art semi-regenerative process is a reduction in the coke content on the catalyst particles leaving the first reactor and entering the other reactor. This advantage is more pronounced at lower hydrogen recycle ratios to the first reactor. This advantage may in some cases in turn decrease the coke content on the catalyst leaving the second reactor, which can be easily exploited to increase the profitability of a reforming process. For example, if the regeneration section of a reforming process is already operating at its maximum coke-burning capacity, this invention may allow the reactor section, in particular the other reactor, to be operated at conditions that would not have been considered practical because of their effect on coke formation. Thus with this invention, feedstock costs could be decreased by charging a less-expensive paraffinic naphtha to the reforming process, a more valuable product could be produced by increasing reformate octane, or utilities costs could be reduced by decreasing the recycle gas ratio. By operating at these new conditions, the reforming process would become more profitable. Alternatively, even if no changes were made in the operating conditions of the reforming process, this invention may allow the frequency of catalyst regeneration to be decreased. Less frequent regenerations would slow the deterioration of the select catalytic properties (surface area, metal dispersion, etc.) that occur as a result of the frequent regenerations. This would in turn prolong the period of time between catalyst changeouts and decrease the catalyst replacement costs. For catalysts that have suffered deterioration in surface area, this invention would help to maintain high catalyst activity by decreasing the average coke content of the catalyst in the reactors for the same operating conditions.

The temperature difference between the first reactor and the other reactor is most easily and most advantageously achieved by passing the combined feed stream from the combined feed exchanger to the first reactor without any intermediate heating. Thus, in one embodiment this invention is a reforming process in which the combined feed stream from the combined feed exchanger passes, without any additional heating, to the first reactor. This embodiment is, therefore, a reforming process that does not require a charge heater. Accordingly, the heat that is recovered from the last reactor effluent and transferred to the combined feed by the combined feed exchanger is sufficient to heat the combined feed stream to the desired inlet temperature of the first reactor.

One way to think about this embodiment of the invention is in comparison with a prior art reforming process that uses n reactors. From this point of view, the principal benefit of this embodiment is the reduction in capital cost by eliminating the charge heater. That is, this embodiment requires no more than n−1 heaters, rather than the n heaters used in the prior art process. The savings in capital cost include the cost not only of the mechanical components of the charge heater itself, such as the heater tubes, refractory linings, outer shell, and foundation, but also of the associated electrical instrumentation, and of the interconnecting piping both upstream from the combined feed exchanger and downstream to the first reactor. In addition, in some embodiments of this invention elimination of the charge heater reduces the pressure drop of the reactor section, which decreases the energy-related operating cost of the recycle compressor, as well as the capital cost of the recycle compressor and its associated motor or turbine. Also, elimination of the charge heater decreases the plot space that would have been occupied by the charge heater, thereby freeing that plot space for other more profitable or productive uses.

Another way of looking at this embodiment of the invention is in comparison with a reforming process that uses n heaters. In this light, another benefit of eliminating the charge heater is an increase in the efficient use of the catalyst, by employing n+1 reactors, as opposed to only n reactors in the prior art processes. As a general rule, given the same amount of catalyst in a reforming process, as the number of reactors increases, the efficiency of use of the catalyst also increases. So, for example, a 5-reactor reforming process uses a given amount of catalyst more efficiently than a 4-reactor reforming process, which in turn uses that same given amount of catalyst more efficiently than a 3-reactor system. Thus, for a given amount of catalyst and a given number of heaters, this embodiment employs the catalyst more efficiently than the prior art processes.

Yet another way of thinking about this embodiment of the invention is in comparison with two prior art processes, namely a prior art process that uses n reactors and n heaters and another prior art process that uses n+1 reactors and n+1 heaters. For a given quality and quantity of feedstock and a given reformate product quality, a refiner who wished to build a new moving bed reforming process unit was forced to choose between only two options: n reactors and n heaters, or n+1 reactors and n+1 heaters. For most refiners, the value of n is 3, and so the refiner had to choose between 3 reactors and 3 heaters, or 4 reactors and 4 heaters. The refiner made the final decision based on an economic evaluation of the total return on his investment both in catalyst on the one hand and in equipment and machinery on the other.

Unfortunately, it has often been the case that neither a 3 reactor/3 heater process nor a 4 reactor/4 heater process is the economic optimum, and the refiner has had to choose the less-worse of two non-optimum choices. The advantage of the embodiment of this invention that eliminates the charge heater, then, is to give the refiner a new, third choice, such as a 4 reactor/3 heater process, that is intermediate between the two prior art choices and is possibly closer to the refiner's economically optimum process unit. This invention does not necessarily allow the refiner to avoid undertaking an economic evaluation such as that used to evaluate the prior art processes. Instead, this invention gives the refiner an additional option for the outcome of that evaluation that may in some cases be the most profitable option of all.

Accordingly, this invention is in its broadest terms is a process for reforming hydrocarbons. A feedstock comprising hydrocarbons is passed to a first catalyst bed that contains catalyst particles. The feedstock enters the first catalyst bed at a first inlet temperature. In the first catalyst bed, hydrocarbons contact the catalyst particles and are reformed. A first bed effluent stream comprising hydrocarbons is withdrawn from the first catalyst bed. At least a portion of the first bed effluent stream passes to a second catalyst bed which contains catalyst particles. At least a portion of the first bed effluent stream enters the second catalyst bed at a second inlet temperature that is at least about 60° F. greater than the first inlet temperature. In the second catalyst bed, hydrocarbons are contacted with catalyst particles and reformed. A second bed effluent stream comprising reformate is withdrawn from the second catalyst bed. Reformate is recovered from the second bed effluent stream. At least periodically, catalyst particles move through the first catalyst bed and the second catalyst bed by withdrawing catalyst particles from the second catalyst bed, passing catalyst particles from the first catalyst bed to the second catalyst bed, and adding catalyst particles to the first catalyst bed.

In another embodiment, this invention is a process for reforming hydrocarbons. A combined feed stream comprising hydrocarbons and hydrogen passes to a combined feed heat exchanger, which heats the combined feed stream to produce a heated feed stream that comprises hydrocarbons and hydrogen. Without heating, at least a portion of the heated feed stream passes to a first reactor at a combined feed temperature. In the first reactor, hydrocarbons contact catalyst particles in a first catalyst bed and are reformed. A first reactor effluent stream comprising hydrocarbons is withdrawn from the first reactor. At least a portion of the first reactor effluent stream passes to a first heater, which heats the stream to produce a second reactor feed stream comprising hydrocarbons. At least a portion of the second reactor feed stream passes to a second reactor at a second reactor feed temperature that is at least about 60° F. greater than the combined feed temperature. In a second catalyst bed in the second reactor, hydrocarbons contact catalyst particles and are reformed. A second reactor effluent stream comprising hydrocarbons is withdrawn from the second reactor. At least a portion of the second reactor effluent stream passes to the combined feed heat exchanger. In the combined feed heat exchanger, heat is exchanged from the portion of the second reactor effluent stream to the combined feed stream. A combined feed exchanger effluent stream comprising reformate is withdrawn from the combined feed heat exchanger. Reformate is recovered from the combined feed exchanger effluent stream. Catalyst particles are at least periodically moved through the first catalyst bed and the second catalyst bed by withdrawing catalyst particles from the second catalyst bed, passing catalyst particles from the first catalyst bed to the second catalyst bed, and adding catalyst particles to the first catalyst bed.

INFORMATION DISCLOSURE

Catalytic reforming is described in Chapter 4.1, "UOP Platforming Process," of the book entitled Handbook of Petroleum Refining Processes, Second Edition, edited by Robert A. Meyers, published by McGraw-Hill Book Company, in New York, in 1997. The teachings of Chapter 4.1 of Meyers' book are incorporated herein by reference.

U.S. Pat. No. 3,652,231 (Greenwood et al.) describes a process for the catalytic reforming of hydrocarbons with continuous catalyst regeneration that employs an apparatus that uses moving catalyst beds. U.S. Pat. No. 3,647,680 (Greenwood et al.) and U.S. Pat. No. 3,692,496 (Greenwood et al.) also describe the regeneration of reforming catalyst. The teachings of U.S. Pat. Nos. 3,652,231, 3,647,680, and 3,692,496 are incorporated herein by reference.

U.S. Pat. No. 4,325,806 (Peters) discloses a hydrocarbon conversion process having at least three reaction zones, wherein one portion of the effluent of the first reaction zone is passed to the second reaction zone, and another portion of the effluent of the first reaction zone is combined with the entire effluent of the second reaction zone and passed to a third reaction zone.

U.S. Pat. No. 4,325,807 (Peters) discloses a hydrocarbon conversion process having at least four reaction zones, where the first and second reaction zones are in a parallel-flow arrangement. In addition, the combined effluent of the first and second reaction zones is divided into two portions: one portion is passed to the third reaction zone, and the other portion is combined with the entire effluent of the third reaction zone and passed to the fourth reaction zone.

BRIEF DESCRIPTION OF THE DRAWING

The drawing is a process flow diagram of an embodiment of the invention.

DETAILED DESCRIPTION OF THE INVENTION

The hydrocarbon feedstock that is charged to this invention will comprise naphthenes and paraffins that boil within the gasoline range. The preferred charge stocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling initial boiling point of from about 104 to about 180° F. (40 to 82° C.) and an end boiling point within the range of from about 320 to about 428° F. (160 to 220° C.), or may be a selected fraction thereof which generally will be a higher-boiling fraction commonly referred to as a heavy naphtha—for example, a naphtha boiling in the range of from about 212 to about 392° F. (100 to 200° C.). In some cases, it is also advantageous to charge pure hydrocarbons or mixtures of hydrocarbons that have been recovered from extraction units—for example, raffinates from aromatics extraction or straight-chain paraffins—which are to be converted to aromatics. In some other cases, the feedstock may also contain light hydrocarbons that have from 1 to 5 carbon atoms, but since these light hydrocarbons cannot be readily reformed into aromatic hydrocarbons, these light hydrocarbons entering with the feedstock are generally minimized.

This invention is applicable to the catalytic reforming of hydrocarbons in a reforming reaction system having at least two catalytic reaction zones where at least a portion of the reactant stream and at least a portion of the catalyst particles flow serially through the reaction zones. Reaction systems having multiple zones generally take one of two forms, a side-by-side form or a stacked form. In the side-by-side form, multiple and separate reaction vessels, each comprising a reaction zone, are placed along side each other. In the stacked form, one common reaction vessel contains the multiple and separate reaction zones that are placed on top of each other.

Although the reaction zones can comprise any number of arrangements for hydrocarbon flow such as downflow, upflow, and crossflow, the most common reaction zones to which this invention is applied are radial flow. A radial flow reaction zone generally consists of cylindrical sections having varying nominal cross-sectional areas, vertically and coaxially disposed to form the reaction zone. Briefly, a radial flow reaction zone typically comprises a cylindrical reaction vessel containing a cylindrical outer catalyst retaining screen and a cylindrical inner catalyst retaining screen that are both coaxially-disposed with the reaction vessel. The inner screen has a nominal, internal cross-sectional area that is less than that of the outer screen, which has a nominal, internal cross-sectional area that is less than that of the reaction vessel. The reactant stream is introduced into the annular space between the inside wall of the reaction vessel and the outside surface of the outer screen. The reactant stream passes through the outer screen, flows radially through the annular space between the outer screen and the inner screen, and passes through the inner screen. The stream that is collected within the cylindrical space inside the inner screen is withdrawn from the reaction vessel. Although the reaction vessel, the outer screen, and the inner screen may be cylindrical, they may also take any suitable shape, such as triangular, square, oblong, and diamond, depending on many design, fabrication, and technical considerations. For example, it is common for the outer screen to not be a continuous cylindrical screen but to instead be an arrangement of separate, elliptical, tubular screens called scallops that are arrayed around the circumference of the inside wall of the reaction vessel. The inner screen is commonly a perforated centerpipe that is covered around its outer circumference with a screen.

In this invention, the reformer employs at least two moving catalyst beds for reforming hydrocarbons. It is an essential aspect of this invention that catalyst particles withdrawn from the first moving catalyst bed pass to the second moving catalyst bed. Preferably, each moving bed is a moving packed bed and all of the catalyst particles withdrawn from the first bed pass to second bed. This invention is applicable to catalytic reforming processes wherein the catalyst comprises particles that are movable through at least two reaction zones. The catalyst particles are movable through the reaction zones by any of a number of motive devices including conveyors or transport fluid, but most commonly the catalyst particles are movable through the reaction zone by the force of gravity. Typically, in a radial flow reaction zone the catalyst particles fill the annular space between the inner and outer screens, which is called the catalyst bed. Catalyst particles are withdrawn from a bottom portion of a reaction zone, and catalyst particles are introduced into a top portion of the reaction zone. The catalyst particles withdrawn from a reaction zone can subsequently be recovered from the process, regenerated in a regeneration zone of the process, or transferred to another reaction zone. Likewise, the catalyst particles added to a reaction zone can be catalyst that is being newly added to the process, catalyst that has been regenerated in a regeneration zone within the process, or catalyst that is transferred from another reaction zone.

Illustrative reaction vessels that have stacked reaction zones and that may be used to practice this invention are shown in U.S. Pat. Nos. 3,706,536 (Greenwood, et al.) and 5,130,106 (Greenwood, et al.), the teachings of which are incorporated herein by reference. Transfer of the gravity-flowing catalyst particles from one reaction to another, the introduction of fresh or regenerated catalyst particles, and the withdrawal of coke-containing spent catalyst particles is effected through catalyst transfer conduits.

The reforming reactions that occur in the present invention are normally effected in the presence of catalyst particles comprised of one or more Group VIII (IUPAC 8–10) noble metals (e.g., platinum, iridium, rhodium, and palladium) and a halogen combined with a porous carrier, such as a refractory inorganic oxide. U.S. Pat. No. 2,479,110, for example, teaches an alumina-platinum-halogen reforming catalyst. Although the catalyst may contain 0.05–2.0 wt-% of Group VIII metal, this invention is most economical when practiced in the presence of a less expensive catalyst, such as a catalyst containing 0.05–0.5 wt-% of Group VIII metal. The preferred noble metal is platinum. In addition, the catalyst may contain indium and/or a lanthanide series metal such as cerium. The catalyst particles may also contain 0.05–0.5 wt-% of one or more Group IVA (IUPAC 14) metals (e.g., tin, germanium, and lead), such as described in U.S. Pat. No. 4,929,333, U.S. Pat. No. 5,128,300, and the references cited therein. The halogen is normally chlorine. Alumina is a commonly used carrier. The preferred alumina materials are known as gamma, eta, and theta alumina, with gamma and eta alumina giving the best results. An important property related to the performance of the catalyst is the surface area of the carrier. Preferably, the carrier will have a surface area of from about 100 to about 500 $m^2/g$. The activity of catalysts having a surface area of less than about 130 $m^2/g$ is known to be more detrimentally affected by catalyst coke than catalysts having a higher surface area. Accordingly, the benefit of this invention is believed to be greater for processes that use a catalyst having a surface area of less than about 130 $m^2/g$, because of the reduction in coke content of the catalyst leaving the first reactor. The particles are usually spheroidal and have a diameter of from about $1/16^{th}$ to about $1/8^{th}$ inch (1.6 to 3.1 mm), though they may be as large as $1/4^{th}$ inch (6.35 mm) or as small as $1/24^{th}$ inch (1.06 mm). In a particular reforming reactor, however, it is desirable to use catalyst particles which fall in a relatively narrow size range. A preferred catalyst particle diameter is $1/16^{th}$ inch (1.6 mm).

In preferred form, the reforming process will employ a moving bed reaction vessel and a moving bed regeneration vessel, and the present invention is applicable to such a reforming process. Regenerated catalyst particles are fed to the reaction vessel, which is typically comprised of several reaction zones, and the particles flow through the reaction vessel by gravity. Catalyst is withdrawn from the bottom of the reaction vessel and transported to the regeneration vessel. In the regeneration vessel, a multi-step regeneration process is typically used to regenerate the catalyst to restore its full ability to promote reforming reactions. U.S. Pat. Nos. 3,652,231 (Greenwood et al.), 3,647,680 (Greenwood et al.) and 3,692,496 (Greenwood et al.) describe catalyst regeneration vessels that are suitable for use in a reforming process. Catalyst flows by gravity through the various regeneration steps and then is withdrawn from the regeneration vessel and transported to the reaction vessel. Arrangements are provided for adding fresh catalyst as make-up to and for withdrawing spent catalyst from the process. Movement of catalyst through the reaction and regeneration vessels is often referred to as continuous though, in practice, it is semicontinuous. By semicontinuous movement it is meant the repeated transfer of relatively small amounts of catalyst at closely spaced points in time. For example, one batch every twenty minutes may be withdrawn from the bottom of the reaction vessel and withdrawal may take five minutes, that is, catalyst will flow for five minutes. If the catalyst inventory in a vessel is relatively large in comparison with this batch size, the catalyst bed in the vessel may be considered to be continuously moving. A moving bed system has the advantage of maintaining production while the catalyst is removed or replaced.

As mentioned previously, this invention is a new moving bed reforming process that may be a more economical or profitable option than any of the prior art moving bed reforming processes. Whether this invention is the most economical or profitable option for a given refiner requires an economic evaluation of the refiner's total return on investment in catalyst and equipment. A complete economic evaluation is not necessary to practice this invention and therefore does not need to be described in detail herein. However, such an economic evaluation will generally take into account a large number of factors that are interrelated in a complex manner. These factors include feedstock composition (e.g., paraffins, naphthenes, and aromatics in the feedstock), liquid hourly space velocity, recycle gas ratio, reactor inlet temperatures, reactor outlet temperatures, catalyst performance, catalyst cost, reactor fabrication cost, minimum and maximum reactor dimensions, from the viewpoint of ease in fabrication as well as of ease in maintenance, and reformate octane.

The reaction zones of the present invention are operated at reforming conditions, which include a range of pressures generally from atmospheric pressure (0 psi(g)) to 1000 psi(g) (0 to 6895 kPa(g)), with particularly good results obtained at the relatively low pressure range of from about 40 to about 200 psi(g) (276 to 1379 kPa(g)). The overall liquid hourly space velocity (LHSV) based on the total catalyst volume in all of the reaction zones is generally from 0.1 to 10 $hr^{-1}$, preferably from about 1 to about 5 $hr^{-1}$, and more preferably from about 1.5 to about 2.0 $hr^{-1}$. A relatively low LHSV is preferred because a process operating at a low LHSV employs a relatively large volume of catalyst per volume of feedstock that is charged to the reforming process, and in general the greater the volume of catalyst that is present in a process, the more readily it is that a portion of the catalyst can operate at a relatively low temperature while the process nevertheless achieves the desired reformate product quality.

Generally, hydrogen is supplied to provide an amount of from about 1 to about 20 moles of hydrogen per mole of hydrocarbon feedstock entering the reforming zone. Hydrogen is preferably supplied to provide an amount of less than about 3.5 moles of hydrogen per mole of hydrocarbon feedstock entering the reforming zone. If hydrogen is supplied, it may be supplied upstream of the combined feed exchanger, downstream of the combined feed exchanger, or both upstream and downstream of the combined feed exchanger. Providing hydrogen with the hydrocarbon feedstock is not, however, a requirement of this invention, and thus it is possible that no hydrogen may be supplied to enter the reforming zone with the hydrocarbon feedstock. Even if hydrogen is not provided with the hydrocarbon feedstock to the first reaction zone, the naphthene reforming reactions that occur within the first reaction zone yield hydrogen as a by-product. This by-product, or in-situ-produced, hydrogen leaves the first reaction zone in an admixture with the first reaction zone effluent and then becomes available as hydrogen to the second reaction zone and other downstream reaction zones. This in situ hydrogen in the first reaction zone effluent usually amounts to between 0.5 and 2 moles of hydrogen per mole of hydrocarbon feedstock.

It is believed that one of the benefits of this invention, namely a reduction in the formation of coke on the catalyst, is more pronounced as the molar ratio of hydrogen per hydrocarbon feedstock to the first reactor decreases. Thus, it is expected that, as the molar ratio decreases from 3.5 to say 2.0, or to even lower ratios such as 1.0 or 0.5, a decrease in the inlet temperature of the first reactor significantly decreases the coke formation in the first reactor relative to the first reactor of the prior processes that operate at a higher temperature. Furthermore, it is believed that any increased coke formation that occurs in the second, third, and/or subsequent reactors of this invention will be more than offset by the decreased coke formation in the first reactor, so that the overall coke make in this invention will be less than that in the prior art processes. In addition, it should be pointed out that the lower coke contents of the catalyst that passes through the second, third, and/or subsequent reactors in this invention can have a beneficial affect on the performance of some catalysts, such as catalysts having low surface area, in those reactors, particularly from the point of view of catalyst activity.

Typically, the rate of catalyst movement through the catalyst beds may range from as little as 200 pounds (90.7 kg) per hour to 4500 pounds (2041 kg) per hour, or more.

The combined feed stream, or the hydrocarbon feedstock if no hydrogen is provided with the hydrocarbon feedstock, enters a heat exchanger at a temperature of generally from about 150 to about 350° F. (65 to 177° C.), and more usually from about 200 to about 250° F. (93 to 121° C.). Because hydrogen is usually provided with the hydrocarbon feedstock, this heat exchanger may be referred to herein as the combined feed heat exchanger, even if no hydrogen is supplied with the hydrocarbon feedstock. The combined feed heat exchanger heats the combined feed stream by transferring heat from the effluent stream of the last reforming reactor to the combined feed stream. The combined feed heat exchanger is preferably an indirect, rather than a direct, heat exchanger, in order to prevent valuable reformate product in the last reactor's effluent from intermixing with the combined feed and thereby being recycled to the reforming reactors, where the reformate quality could be degraded.

Although the flow pattern of the combined feed stream and the last reactor effluent stream within the combined feed heat exchanger could be completely-cocurrent, reversed, mixed, or cross flow, the flow pattern is preferably countercurrent. By a countercurrent flow pattern, it is meant that the combined feed stream, while at its coldest temperature, contacts one end (i.e., the cold end) of the heat exchange surface of the combined feed heat exchanger while the last reactor effluent stream contacts the cold end of the heat exchange surface at its coldest temperature also. Thus, the last reactor effluent stream, while at its coldest temperature within the heat exchanger, exchanges heat with the combined feed stream that is also at its coldest temperature within the heat exchanger. At another end (i.e., the hot end) of the combined feed heat exchanger surface, the last reactor effluent stream and the combined feed stream, both at their hottest temperatures within the heat exchanger, contact the hot end of the heat exchange surface and thereby exchange heat. Between the cold and hot ends of the heat exchange surface, the last reactor effluent stream and the combined feed stream flow in generally opposite directions, so that, in general, at any point along the heat transfer surface, the hotter the temperature of the last reactor effluent stream, the hotter is the temperature of combined feed stream with which the last reactor effluent stream exchanges heat. For further information on flow patterns in heat exchangers, see, for example, pages 10–24 to 10–31 in *Perry's Chemical Engineers' Handbook,* Sixth Edition, edited by Robert H. Perry et al., published by McGraw-Hill Book Company in New York, in 1984, and the references cited therein.

In this invention, the combined feed heat exchanger generally operates with a hot end approach that is generally less than about 100° F. (56° C.), and preferably less than about 60° F. (33° C.), and more preferably less than about 50° F. (28° C.). As used herein, the term "hot end approach" is defined as follows, based on a heat exchanger that exchanges heat between a hotter last reactor effluent stream and a colder combined feed stream, where T1 is the inlet temperature of the last reactor effluent stream, T2 is the outlet temperature of the last reactor effluent stream, t1 is the inlet temperature of the combined feed stream, and t2 is the outlet temperature of the combined feed stream. Then, as used herein, for a countercurrent heat exchanger the "hot end approach" is defined as the difference between T1 and t2. In general, the smaller the hot end approach, the greater is the degree to which the heat in the last reactor's effluent is exchanged to the combined feed stream, and the lesser is the need for a charge heater.

Although some shell-and-tube type heat exchangers are capable of achieving the hot end approaches set forth in the prior two paragraphs, the preferred type of heat exchanger for use in this invention is a plate type heat exchanger. Plate type exchangers are well known and commercially available in several different and distinct forms, such as spiral, plate and frame, brazed-plate fin, and plate fin-and-tube types. Plate type exchangers are described generally at pages 11–21 to 11–23 in *Perry's Chemical Engineers' Handbook,* Sixth Edition, edited by R. H. Perry et al., and published by McGraw Hill Book Company, in New York, in 1984.

The combined feed stream leaves the combined feed heat exchanger at a temperature of generally from about 750 to about 960° F. (399 to 516° C.). Because in one embodiment of this invention there is no heating between the combined feed heat exchanger and the lead or first reactor, the outlet temperature of the combined feed stream from the combined feed heat exchanger is essentially the same as the temperature of the inlet temperature of the first reforming reactor. However, as a practical matter, there may be some loss of heat between the outlet of the combined feed exchanger and the inlet of the first reactor, and therefore in this context, the expression "essentially the same" means that the inlet temperature of the first reforming reactor is generally not more than 10° F. (5° C.), and preferably not more than 2° F. (1° C.), less than the temperature of the outlet of the combined feed exchanger. Accordingly, the inlet temperature of the first reaction zone is generally from about 750° to about 960° F. (399° to 516° C.), preferably from about 800° to about 900° F. (427° to 482° C.).

As mentioned previously, naphthene reforming reactions that are endothermic occur in the first reaction zone, and thus the outlet temperature of the first reaction zone is less than the inlet temperature of the first reaction zone and is generally from about 600° to about 850° F. (316 to 454° C.). The first reaction zone contains generally from about 5% to about 50%, and more usually from about 10% to about 30%, of the total catalyst volume in all of the reaction zones. Consequently, the liquid hourly space velocity (LHSV) in the first reaction zone, based on the catalyst volume in the first reaction zone, is generally from 0.2 to 200 $hr^{-1}$, preferably from about 2 to about 100 $hr^{-1}$, and more preferably from about 5 to about 20 $hr^{-1}$. The catalyst particles that are withdrawn form the first reaction zone and passed to the second reaction zone generally have a coke content of less than 2 wt-% based on the weight of catalyst.

The first reaction zone effluent stream is heated in a heater, such as a gas-fired, an oil-fired, or a mixed gas-and-oil-fired heater, of a kind that is well known to persons of ordinary skill in the art of reforming. The heater may heat the first reaction zone effluent stream by radiant and/or convective heat transfer. Commercial fired heaters for reforming processes typically have individual radiant heat transfer sections for individual heaters and a common convective heat transfer section that is heated by the flue gases from the radiant sections. Thus, in one embodiment of this invention the first reaction zone effluent stream passes first through the common convective section and then through one of the radiant sections, so that the two sections jointly perform the function of one heater. This heater is often referred to as an interheater, because it is located between two reaction zones, namely in this case the first and second reaction zones. The first reaction zone effluent stream leaves the interheater at a temperature of generally from about 900 to about 1040° F. (482 to 560° C.). Accounting for heat losses, the interheater outlet temperature is generally not more than 10° F. (5° C.), and preferably not more than 2° F. (10° C.), more than the inlet temperature of the second reaction zone. Accordingly, the inlet temperature of the second reaction zone is generally from about 900° to about 1040° F. (482° to 560° C.), preferably from about 980° to about 1000° F. (527° to 538° C.), and most preferably from about 987° to about 993° F. (531° to 534° C.). The inlet temperature of the second reaction zone is usually at least about 60° F. (33° C.) greater than the inlet temperature of the first reaction zone, and may be at least about 100° F. (56° C.) or even at least about 150° F. (83° C.) higher than the first reaction zone inlet temperature. The inlet temperature of the second reaction zone is generally from about 60° to about 150° F. (33° to 83° C.), and preferably from about 100° to about 120° F. (56° to 67° C.), greater than the inlet temperature of the first reaction zone.

This invention is particularly applicable to those reforming processes where, if all of the reaction zones operated at the same inlet temperature, then the desired reformate octane could be achieved with inlet temperatures that are well below the maximum operating, or design, temperature of the reaction zone. By "well below", it is meant that the inlet temperature is at least 20° F. (11° C.), and preferably at least 30° F. (17° C.) less than the maximum operating, or design, temperature of the reaction zone. The desired reformate octane of the $C_5+$ fraction of the reformate is generally from 85 to 107 clear research octane number ($C_5+$ RONC), and preferably from 98 to 102 $C_5+$ RONC. The explanation as to why this invention is particularly applicable to such a process relates to the fact that the inlet temperature of the first reaction zone is generally from about 60 to about 150° F. (33 to 83° C.) less than the inlet temperature of the second reaction zone. In the more general case where there is at least one additional interheater-reactor pair downstream of the second reactor, the inlet temperature to the first reaction zone is generally from about 60 to about 150° F. (33 to 83° C.)

less than the inlet temperature of any other reaction zone downstream of its paired interheater.

As persons skilled in the art of reforming know, the reformate product quality ($C_5+$ RONC) in reforming units is generally correlated with a weight average of the inlet temperatures of the reaction zones, or of the average temperatures of the reaction zones. As used herein, the term "weight average temperature of the inlet temperatures of the reaction zones," which is commonly referred to as the "weight average inlet temperature" or "WAIT," is the sum of the products of the inlet temperature for each reactor and the weight of catalyst in that reactor, where the weight of catalyst in that reactor is expressed as a weight fraction of the total weight of catalyst in all of the reactors. Similarly, the term "weight average temperature of the average temperatures of the reaction zones," which is commonly referred to as the "weight average bed temperature" or "WABT," is the sum of the products of the bed temperature for each reactor and the weight of catalyst in that reactor, where the bed temperature is the arithmetic average of the inlet and outlet temperatures for each reaction zone and where, in the same manner as for WAIT, the weight of catalyst in each reactor is expressed as a weight fraction of the total weight of catalyst in all of the reactors.

Thus, this invention is particularly applicable to those reforming processes where, if all of the reaction zones operated at the same inlet temperature, then the desired reformate octane could be achieved with inlet temperatures that are at least 20° F. (11° C.) less than the maximum operating, or design, temperature of the reaction zone because, in order to maintain the same WAIT or WABT when the inlet temperature of the first reaction zone is generally from about 60 to about 150° F. (33 to 83° C.) less than the inlet temperature of the second reaction zone (and that of downstream reaction zones, if any), the inlet temperatures of the second reaction zone (and that of downstream reaction zones, if any) must be increased slightly. If the inlet temperatures of all of the reaction zones are at the same temperature and are already within 20° F. (11° C.) of their maximum operating, or design, temperatures, then it would not be possible as a practical matter to raise the inlets of those other reactors in order to maintain the same WAIT. Accordingly, the reformate $C_5+$ RONC would fall. A temperature difference of at least 20° F. (11° C.) between the inlet temperature and the maximum operating, or design, temperature is desirable in order to provide operating flexibility in the event of catalyst deactivation.

The second reaction zone contains generally from about 10% to about 60%, and more usually from about 15% to about 40%, of the total catalyst volume in all of, the reaction zones. Consequently, the liquid hourly space velocity (LHSV) in the second reaction zone, based on the catalyst volume in the second reaction zone, is generally from 0.13 to 134 $hr^{-1}$, preferably from about 1.3 to about 67 $hr^{-1}$, and more preferably from about 3.3 to about 13.4 $hr^{-1}$.

The second reaction zone effluent can pass to a train of pairs of heaters and reactors that contain moving catalyst beds. That is, the second reaction effluent can pass a second interheater (the first interheater being the previously described interheater between the first and the second reaction zones), and after heating, can pass to a third reaction zone. However, one or more additional heaters and/or reactors after the second reaction zone are not essential elements of this invention; that is, the second reaction zone may be the last reaction zone in the train. The third reaction zone contains generally from about 25% to about 75%, and more usually from about 30% to about 50%, of the total catalyst volume in all of the reaction zones. Likewise, the third reaction zone effluent can pass to a third interheater and from there to a fourth reactor. The fourth reaction zone contains generally from about 30% to about 80%, and more usually from about 40% to about 50%, of the total catalyst volume in all of the reaction zones. The inlet temperatures of the third, fourth, and subsequent reaction zones are generally within from about 18° F. (10° C.) of the inlet temperature of the second reaction zone.

Because the reforming reactions that occur in the second and subsequent (i.e., third and fourth) reaction zones are generally less endothermic than those that occur in the first reaction zone, the temperature drop that occurs in the later reaction zones is generally less than that that occurs in the first reaction zone. Thus, the outlet temperature of the last reaction zone may be 20° F. (11° C.) or less below the inlet temperature of the last reaction zone, and indeed may conceivably be higher than the inlet temperature of the last reaction zone. This invention is most applicable when the temperature drop across the last reaction zone is relatively small or nonexistent, because as the outlet temperature of the last reaction zone increases the heat carried by the effluent of the last reaction zone effluent stream can be more readily transferred to the combined feed stream via the combined feed heat exchanger. In addition, for a given hot end approach in a countercurrent combined feed exchanger, as the temperature of the last reaction zone effluent stream increases, the temperature of the heated combined feed stream to the first reaction zone increases.

As previously mentioned, the last reaction zone effluent stream is cooled in the combined feed heat exchanger by transferring heat to the combined feed stream. After leaving the combined feed heat exchanger, the cooled last reactor effluent passes to a product recovery section. Suitable product recovery sections are known to persons of ordinary skill in the art of reforming and do not, therefore, require detailed description herein. Briefly, such product recovery facilities generally include gas-liquid separators for separating hydrogen and $C_1$–$C_3$ hydrocarbon gases from the last reactor effluent stream, and fractionation columns for separating at least a portion of the $C_4$–$C_5$ light hydrocarbons from the remainder of the reformate. In addition, the reformate may be separated by distillation into a light reformate fraction and a heavy reformate fraction The drawing illustrates an embodiment of the present invention. The drawing is presented solely for purposes of illustration and is not intended to limit the scope of the invention as set forth in the claims. The drawing shows only the equipment and lines necessary for an understanding of the invention and does not show equipment such as pumps, compressors, heat exchangers, and valves which are not necessary for an understanding of the invention and which are well known to persons of ordinary skill in the art of hydrocarbon processing.

The drawing shows a common reaction vessel 100 that contains four stacked reaction zones: an upper first reaction zone 10, an intermediate second reaction zone 20, an intermediate third reaction zone 30, and a bottom fourth reaction zone 40. These four reaction zones are sized as to length and annular cross-sectional area of the catalyst bed such that the distribution of the total catalyst volume is 10% in reaction zone 10, 15% in reaction zone 20, 25% in reaction zone 30, and 50% in reaction zone 40. Although the reaction zones 10, 20, 30, and 40 are contained in a common reaction vessel 100, the reaction zones may be contained in two or more reaction vessels. The drawing does not limit the number of reaction zones that are contained in a single reaction vessel.

In normal operation, fresh or regenerated catalyst particles are introduced through a line 24 and an inlet nozzle 26 into first reaction zone 10. The catalyst particles flow by gravity from first reaction zone 10 to second reaction zone 20, from second reaction zone 20 to third reaction zone 30, and from third reaction zone 30 to fourth reaction zone 40. The catalyst particles are ultimately withdrawn from common reaction vessel 100 through an outlet nozzle 52 and a line 54. Catalyst particles withdrawn through the line 54 may be transported to a conventional continuous regeneration zone, which is not shown in the drawing. The flow rate of catalyst through the common reactor vessel 100 can be controlled by regulating the rate of withdrawal of catalyst particles through line 54 in order to achieve a desired degree of catalytic performance (i.e., activity of catalyst, yield of desired products, and selectivity of desired products over undesired by-products) in the reaction zones 10, 20, 30, and 40.

Turning next to the flow of hydrocarbons, a feedstock comprising a straight-run naphtha gasoline fraction boiling in the 180–400° F. (82–204° C.) range is charged to the process through a line 12 and is admixed with a hydrogen-rich gas stream flowing through a line 16 to form a combined feed stream. The combined feed stream flows through a line 14 to a plate type combined feed heat exchanger 50, which heats the combined feed stream by heat exchange with the effluent stream of fourth reaction zone 40 flowing through a line 56. The heated combined feed stream passes through a line 22 and to the first reaction zone 10.

An effluent stream is recovered from the first reaction zone 10 through a line 28 and becomes the feed stream to the second reaction zone 20. Because reforming reactions are generally endothermic, the second reaction zone feed stream passes through a heater 32 which reheats the stream to the desired inlet temperature of the second reaction zone 20. After heating, the second reaction zone feed stream passes through a line 34 to enter second reaction zone 20. An effluent stream is recovered from the second reaction zone 20 through a line 36.

The effluent stream from the second reaction zone 20 passes through line 36, through a heater 38 which heats the stream to the desired inlet temperature of the third reaction zone 30, and then through a line 42 to enter third reaction zone 30. Typical inlet temperatures and reaction pressures for the third reaction zone 30 are the same as those for the second reaction zone 20. An effluent stream is recovered from the third reaction zone 30 through a line 44.

The effluent stream from the third reaction zone 30 passes through the line 44, through a heater 46 which heats the stream to the desired inlet temperature of the fourth reaction zone 40, and then through a line 48 to enter fourth reaction zone 40. Typical inlet temperatures and reactor pressures for the fourth reaction zone 40 are the same as those for the second and third reaction zones, 20 and 30, respectively. An effluent stream is recovered from the fourth reaction zone 40 through the line 56.

The effluent stream from the fourth reaction zone 40 passes to the plate type combined feed heat exchanger 50, which cools the effluent stream by heat exchange with the combined feed stream flowing through the line 14. The fourth reaction zone effluent stream then passes through a line 52 to a cooler 54 which cools the effluent stream to the desired inlet temperature of the separator 60, and then passes through a line 56 to separator 60. In separator 60, the effluent stream is separated into a hydrogen-containing gas stream that is withdrawn through a line 18 and a liquid stream containing the product reformate that is withdrawn through a line 58. One portion of the hydrogen-containing gas stream flows through a line 16, combines with straight-run naphtha being charged to the process, and is recycled to the common reaction vessel 100, as described previously. Another portion of the hydrogen-rich gas stream is passed through a line 62 to conventional product separation facilities, which are not shown in the drawing, for recovery of a hydrogen-rich gas stream. By a hydrogen-rich gas stream, it is meant a gas stream having a hydrogen content of at least 50 mol-%. The product reformate stream is passed through the line 58 to conventional product separation facilities, which are also not shown in the drawing, for recovery is of high octane product, for example, a reformate having a $C_5$+ RONC of about 100.

EXAMPLE

The following example is intended to further illustrate the subject process. This illustration of an embodiment of the invention is not meant to limit the claims of this invention to the particular details of this example. This example is based on engineering calculations and actual operating experience with similar processes.

This example compares the reactor inlet temperatures of a 4-reactor/4-heater process and a 4-reactor/3-heater process. The two processes are both moving bed processes with continuous regeneration which each reform the same feedstock at the same feed rate. The LHSV, hydrogen to hydrocarbon molar ratio, reactor pressure, catalyst, $C_5$+ RONC, and catalyst circulation rate each are the same in both processes. The catalyst distribution in the four reactors of each process is 14%/19%/22%/45%. For the 4-reactor/4-heater process, the inlet temperature of each of the four reactors is 979° F. (526° C.), so the WAIT is 979° F. (526° C.). For the 4-reactor/3-heater process, the inlet temperature of the first reactor is 858° F. (459° C.), and the inlet temperature of each of the second, third, and fourth reactors is 991° F. (533° C.). Thus, the inlet temperature of each of the second, third, and fourth reactors is 133° F. (74° C.) greater than the inlet temperature of the first reactor. For the 4-reactor/3-heater process, the WAIT is 972° F. (522° C.). Even though the reactor costs of the two processes are not significantly different, the 4-reactor/3-heater process has a lower capital cost due to its fewer number of heaters than the 4-reactor/4-heater process, while producing the same quantity and quality of reformate.

What is claimed is:

1. A process for reforming hydrocarbons, the process comprising the steps of:

a) passing a feedstock comprising hydrocarbons to a first catalyst bed containing catalyst particles wherein the feedstock enters the first catalyst bed at a first inlet temperature, contacting hydrocarbons with catalyst particles and reforming hydrocarbons in the first catalyst bed, and withdrawing from the first catalyst bed at a first outlet temperature a first bed effluent stream comprising hydrocarbons, wherein the first outlet temperature is less than the first inlet temperature;

b) passing at least a portion of the first bed effluent stream to a second catalyst bed containing catalyst particles wherein the at least a portion of the first bed effluent stream enters the second catalyst bed at a second inlet temperature that is at least about 100° F. greater than the first inlet temperature, contacting hydrocarbons with catalyst particles and reforming hydrocarbons in the second catalyst bed, and withdrawing from the second catalyst bed a second bed effluent stream comprising reformate;

c) recovering reformate from the second bed effluent stream; and d) at least periodically moving catalyst particles through the first catalyst bed and the second catalyst bed by withdrawing catalyst particles from the second catalyst bed, passing catalyst particles from the first catalyst bed to the second catalyst bed, and adding catalyst particles to the first catalyst bed.

2. The process of claim 1 wherein the first inlet temperature is from about 750 to about 960° F.

3. The process of claim 1 wherein the second inlet temperature is from about 900 to about 1040° F.

4. The process of claim 1 further characterized in that the reforming of hydrocarbons in the first catalyst bed comprises dehydrogenating naphthenes, and the at least a portion of the first effluent stream comprises hydrogen.

5. The process of claim 1 further characterized in that the catalyst particles that are passed from the first catalyst bed to the second catalyst bed have a coke content of less than 2% by weight of the catalyst particle weight.

6. The process of claim 1 further characterized in that the first catalyst bed operates at first reaction conditions comprising a molar ratio of hydrogen per hydrocarbon of less than 3.5.

7. The process of claim 1 further characterized in that catalyst particles withdrawn from the second catalyst bed and having an inlet content of coke pass to a regeneration bed comprising catalyst particles, catalyst particles move at least periodically through the regeneration bed and coke is combusted from catalyst particles in the regeneration bed, catalyst particles containing an outlet content of coke that is less than the inlet content are withdrawn from the regeneration bed, and the catalyst particles added to the first catalyst bed in Step (d) comprise catalyst particles withdrawn the regeneration bed.

8. The process of claim 1 further characterized in that the feedstock is passed to a heat exchanger, the feedstock is heated in the feed exchanger to produce a heated stream, the heated stream is passed to the first catalyst bed at the first inlet temperature, at least a portion of the second bed effluent stream at a second outlet temperature is passed to the heat exchanger, heat is indirectly exchanged in the heat exchanger from the at least a portion of the second bed effluent stream to the feed stream, a cooled stream is withdrawn from the heat exchanger, and the recovering of reformate from the second bed effluent stream comprises recovering reformate from the cooled stream.

9. The process of claim 8 further characterized in that the difference between the second outlet temperature and the first inlet temperature is less than about 100° F.

10. The process of claim 1 wherein the second inlet temperature is at least about 150° F. greater than the first inlet temperature.

11. The process of claim 1 further characterized in that the catalyst particles have a surface area of less than about 130 $m^2/g$.

12. The process of claim 1 further characterized in that the first inlet temperature is from about 750 to about 960° F. and the first outlet temperature is from about 600 to about 850° F.

13. A process for reforming hydrocarbons, the process comprising the steps of:

a) passing a combined feed stream comprising hydrocarbons and hydrogen to a combined feed heat exchanger, and heating the combined feed stream in the combined feed heat exchanger to produce a heated feed stream comprising hydrocarbons and hydrogen;

b) passing without heating at least a portion of the heated feed stream to a first reactor wherein the at least a portion of the heated feed stream enters the first reactor at a combined feed temperature, contacting hydrocarbons with catalyst particles in a first catalyst bed in the first reactor and reforming hydrocarbons in the first reactor, and withdrawing from the first reactor at a first reactor outlet temperature a first reactor effluent stream comprising hydrocarbons, wherein the first reactor outlet temperature is less than the combined feed temperature;

c) passing at least a portion of the first reactor effluent stream to a first heater, and heating the at least a portion of the first reactor effluent stream in the first heater to produce a second reactor feed stream comprising hydrocarbons;

d) passing at least a portion of the second reactor feed stream to a second reactor wherein the at least a portion of the second reactor feed stream enters the second reactor at a second reactor feed temperature that is at least about 60° F. greater than the combined feed temperature, contacting hydrocarbons with catalyst particles in a second catalyst bed in the second reactor and reforming hydrocarbons in the second reactor, and withdrawing from the second reactor a second reactor effluent stream comprising hydrocarbons;

e) passing at least a portion of the second reactor effluent stream at a last reactor outlet temperature to the combined feed heat exchanger, indirectly exchanging heat in the combined feed heat exchanger from the at least a portion of the second reactor effluent stream to the combined feed stream, and withdrawing from the combined feed heat exchanger a combined feed exchanger effluent stream comprising reformate;

f) recovering reformate from the combined feed exchanger effluent stream; and g) at least periodically moving catalyst particles through the first catalyst bed and the second catalyst bed by withdrawing catalyst particles from the second catalyst bed, passing catalyst particles from the first catalyst bed to the second catalyst bed, and adding catalyst particles to the first catalyst bed.

14. The process of claim 13 further characterized in that the passing of at least a portion of the second reactor effluent to the combined feed heat exchanger comprises passing the at least a portion of the second reactor effluent stream to a second heater, heating the at least a portion of the second reactor effluent in the second heater to produce a second heater effluent stream, passing at least a portion of the second heater effluent stream to a third reactor wherein the at least a portion of the second heater effluent stream enters the third reactor at a third reactor feed temperature that is within 18° F. of the second reactor feed temperature, contacting hydrocarbons with catalyst particles and reforming hydrocarbons in a third catalyst bed in the third reactor, withdrawing a third reactor effluent stream comprising hydrocarbons from the third reactor, and passing at least a portion of the third reactor effluent stream to the combined feed heat exchanger.

15. The process of claim 13 further characterized in that the difference between the last reactor outlet temperature and the combined feed temperature is less than about 100° F.

* * * * *